(12) United States Patent
Ishida et al.

(10) Patent No.: US 6,714,204 B2
(45) Date of Patent: Mar. 30, 2004

(54) IMAGE PROCESSING SYSTEM

(75) Inventors: Masanori Ishida, Nagano-ken (JP); Naoki Kuwata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 222 days.

(21) Appl. No.: 09/957,039

(22) Filed: Sep. 21, 2001

(65) Prior Publication Data
US 2002/0059460 A1 May 16, 2002

(30) Foreign Application Priority Data
Sep. 22, 2000 (JP) ...................................... 2000-288046

(51) Int. Cl.[7] ............................................... G06T 15/00
(52) U.S. Cl. ....................... 345/522; 345/596; 345/597; 345/748; 379/93.17; 379/93.25; 455/566; 709/201; 709/246
(58) Field of Search ................................ 345/596, 597, 345/748, 522; 709/246, 247; 379/93.25

(56) References Cited

U.S. PATENT DOCUMENTS

| | | | | |
|---|---|---|---|---|
| 5,754,309 A | * | 5/1998 | Chen et al. | 358/3.1 |
| 5,911,044 A | * | 6/1999 | Lo et al. | 709/203 |
| 6,011,537 A | * | 1/2000 | Slotznick | 345/733 |
| 6,119,155 A | * | 9/2000 | Rossmann et al. | 709/219 |
| 6,167,442 A | * | 12/2000 | Sutherland et al. | 709/217 |
| 6,430,624 B1 | * | 8/2002 | Jamtgaard et al. | 709/246 |

* cited by examiner

Primary Examiner—Matthew C. Bella
Assistant Examiner—Antonio Caschera
(74) Attorney, Agent, or Firm—Oblon, Spivak, McClelland, Maier & Neustadt, P.C.

(57) ABSTRACT

The present invention provides a system of transmitting image data from a server via a network or another communication path to a cellular phone or another terminal. In order to enhance the picture quality of displayed images, the system causes input image data to be subjected to a tone correction process and a halftoning process according to display characteristics of the terminal. Image processing packages are provided in both the server and the terminal. The system selectively uses these image processing packages according to their processing capacities. The server determines execution or non-execution of image processing according to the type of the terminal. When any image processing is carried out in the server, a control signal representing execution of the image processing is mapped to the processed image data and transmitted to the terminal. The terminal determines requirement of further image processing in response to the control signal and carries out a required series of image processing, which has not been executed by the server. In this system, at least either one of the server and the terminal takes charge of the image processing to enhance the picture quality. Execution of the image processing by the device having the higher image processing capacity effectively improves the processing efficiency.

16 Claims, 11 Drawing Sheets

Fig. 3

A: TONE CORRECTION PROCESS

|  | | A1 SV NPC | A2 SV<TM | A3 SV=TM | A4 SV>TM | A5 TM NPC |
|---|---|---|---|---|---|---|
| B1 | SV NPC | − / A+B | − / A+B | − / A+B | A / B | A / B |
| B2 | SV<TM | − / A+B | − / A+B | − / A+B | A / B | A / B |
| B3 | SV=TM | − / A+B | − / A+B | − / A+B | A / B | A / B |
| B4 | SV>TM | − / A+B | − / A+B | − / A+B | A+B / − | A+B / − |
| B5 | TM NPC | − / A | − / A | − / A | A+B / − | A+B / − |

B: HALFTONING PROCESS

SV: Server
TM: Terminal
NPC: No Processing Capacity

PROCESSING IN SERVER / PROCESSING IN TERMINAL

IMAGE PROCESSING SYSTEM

BACKGROUND OF THE INVENTION

1. Field of the Invention

The present invention relates to a technique of controlling series of image processing carried out for image data by multiple devices connecting with a communication path.

2. Description of the Related Art

The widely known technique utilizes a network like the Internet to download image data and output images from an image output device. Typical applications of the output images are displayed images on an image display device and printed images with a printer. Cellular phones that are capable of gaining access to the Internet may be used as the image display device.

Digital image data are often subjected to diverse series of image processing in the course of image output. The diverse image processing includes, for example, a halftoning process that reduces the number of tones expressed in each pixel, a color conversion process that converts the color system of master image data to the color system of an image output device, and a correction process that corrects the contrast or the tone of image data. Execution of the image processing according to the output characteristics of the device effectively enhances the picture quality of output images.

The device having a relatively low processing capacity, such as the cellular phone, requires an undesirably long processing time for image processing and image display. One possible countermeasure simplifies the image processing to shorten the processing time. But this method does not sufficiently enhance the picture quality of displayed images.

A server may alternatively carry out a required series of image processing. But this method does not improve the picture quality of image data, which is transmitted from a server without the image processing capacity. There are a diversity of image output devices and their applications. The uniform image processing executed in the server may thus not sufficiently enhance the picture quality.

These problems are not restricted to the cellular phones used as the image receiver device, but are common to any image receiver devices that have relatively low processing capacities and are used to output images. Similar problems to those arising in the course of image output are found in the system where the server receives image data transmitted from an image input device, such as a digital camera, via the network.

SUMMARY OF THE INVENTION

The object of the present invention is thus to solve these problems and to provide a technique that carries out required series of image processing according to characteristics of an image transmitter device and an image receiver device in the course of inputting or outputting images via a network or another communication path, so as to attain high-speed processing and sufficiently enhance the picture quality of resulting images.

In order to attain at least part of the above and the other related objects, the present invention combines the functions of an image transmitter device that transmits image data via a communication path with the functions of an image receiver device that makes input image data undergo a required series of image processing, thus attaining the high-speed processing and sufficiently improving the picture quality of resulting images. Namely the technique of the present invention selectively uses the image processing functions of the image transmitter device and the image receiver device.

In the system that downloads image data from a server connecting with the communication path and outputs images from an image display device or a printing device, the server functions as the image transmitter device, whereas the image display device or the printing device functions as the image receiver device. In the system that uploads image data read with a digital camera or a scanner to a server, the digital camera or the scanner functions as the image transmitter device, whereas the server functions as the image receiver device. The server may individually constitute the image transmitter device or the image receiver device, or a plurality of servers may be combined together to take charge of the processing in a distributed manner.

The selective use of the image processing functions of the image transmitter device and the image receiver device ensures the improvement in picture quality to some extent, excluding the special case in which neither of the image transmitter device and the image receiver device has the image processing functions. For example, the image receiver device enables image data transmitted from an image transmitter device without the image processing capacity to be subjected to a required series of image processing. With regard to a certain series of image processing executable by both the image transmitter device and the image receiver device, the technique of the present invention selects either the image transmitter device or the image receiver device for execution of the image processing by taking into account the image processing capacities of the image transmitter device and the image receiver device and the details of the image processing. This arrangement attains the high-speed processing and further enhances the picture quality of resulting images. The construction of the present invention to actualize the selective use of the image processing functions is discussed below in the order of the image transmitter device and the image receiver device.

The image transmitter device of the present invention includes an image processing unit, a control signal generator, and a transmitter unit. The image processing unit causes input master image data to be subjected to a specified series of image processing. The details of the image processing are set according to the type of the image receiver device. The master image data may externally be input into the image transmitter device or may internally be stored in the image transmitter device.

The control signal generator generates a control signal for controlling details of image processing to be executed by the image receiver device, based on the specified series of image processing carried out by the image processing unit of the image transmitter device. The control signal includes information used to identify the series of image processing executed by the image processing unit, if any. The control signal may follow an adequately selected format.

The transmitter unit transmits the control signal and the processed data to the image receiver device. The control signal may be attached to the processed data for simultaneous transmission or may be separately transmitted like transmitting the processed data after transmission of the control signal. As discussed later, the image receiver device changes the details of the image processing executed therein in response to the control signal. This arrangement thus ensures selective use of the image processing functions of the image transmitter device and the image receiver device.

When the image transmitter device has the higher image processing capacity than that of the image receiver device, the image transmitter device carries out the series of image processing, which imposes a significant load on the image receiver device, and the image receiver device is thus released from the image processing. This arrangement ensures execution of the image processing by the device having the higher processing capacity and thus shortens the processing time required for the image output. The image transmitter device may carry out the series of image processing, which is equivalent to the processing executable by the image receiver device or which is more complicated to ensure the further improvement in picture quality than the processing executable by the image receiver device. The image receiver device may take charge of the image processing, according to the image processing capacities of the image transmitter device and the image receiver device.

The image data transmitted from the image transmitter device without the image processing function does not include the control signal. The image receiver device thus readily specifies no execution of any image processing. In such cases, the image receiver device carries out a required series of image processing to enhance the picture quality.

It is desirable that the image data and the control signal of the present invention follow a common format, which is used for image data transmitted from the image transmitter device without the image processing capacity, or have upper compatibility. In one preferable application, a vacant bit included in a header of the image data transmitted without the image processing may effectively be applied for the control signal. In the case of transmitting image data in a specific language, such as HTML (Hyper Text Markup Language), that uses a tag to control the operations of the image receiver device to some extent, the control signal may be defined with the tag. Transmission of the control signal according to the common format used for the conventional image data enables the image receiver device to readily distinguish the image data transmitted from the image transmitter device of the present invention from the image data transmitted from another image transmitter device. The technique of the present invention is, however, not restricted to such applications, but may adopt a unique format or communication protocol proper to the image transmitter device or the image receiver device of the present invention.

The technique of the present invention may be applied to a system, in which a server is used as the image transmitter device and an image output device that outputs images is used as the image receiver device. In one application of this system, when the image receiver device is an image display device having a smaller number of expressible tones than a number of tones included in master image data, the image transmitter device may carry out a dispersed-type color reduction process as the specified series of image processing.

The color reduction process reduces the number of tones expressed in each pixel of the master image data to the number of tones displayable by the image display device. The dispersed-type processing prevents local concentration of pixels having an identical tone values in the processed image data after the color reduction. The dither method and the error diffusion method are known examples of such color reduction.

A known method of color reduction divides a master image into a plurality of divisions in the ascending order of tone values, and successively allocates the tone values after the color reduction to the respective divisions. This method is hereinafter referred to as simple color reduction. The simple color reduction unequivocally maps the tone value of the master image to the tone value after the color reduction. The dispersed-type color reduction, on the other hand, does not unequivocally map the tone value of the master image to the tone value after the color reduction and is thus more complicated than the simple color reduction. The dispersed-type color reduction, however, effectively prevents the occurrence of a quasi-contour after the color reduction and advantageously ensures the better picture quality. Application of the dispersed-type color reduction to the image transmitter device desirably shortens the processing time and enhances the picture quality. The arrangement of using the control signal to control the image processing executed by the image receiver device effectively prevents deterioration of the picture quality, due to the duplicated execution of the color reduction process.

In another application, when the image receiver device is an image display device having a non-linearity of expressible tones, the image transmitter device may carry out a tone correction process to compensate for the non-linearity as the specified series of image processing. The non-linearity here means a non-linear relationship between the tone value and the actually displayed brightness. There is accordingly a variation in expressed brightness difference relative to a fixed range of tone values. Such non-linearity often appears in liquid crystal display devices, especially a liquid crystal display device that adopts a tone display technique called the frame skipping method.

The processing that compensates for the non-linearity means the general processing to relieve the deterioration of the picture quality due to the non-linearity. The processing includes a process of correcting the tone value to ensure the linearity between the tone value and the brightness and a process of correcting the tone value to prevent the occurrence of a quasi-contour due to the non-linearity. The quasi-contour is visually conspicuous, especially in a tone area having a wide brightness range relative to the width of the tone values, that is, in a tone area where the expressed brightness significantly varies with an increase of the tone value by '1'. The latter tone correction is implemented, for example, by reducing the distribution of the number of pixels included in such a tone area, that is, by converting the tone values included in such a tone area into a tone value included in another tone area having a relatively narrow brightness range. A tone curve representing the mapping of the tone values before and after the processing may be used for the tone correction.

The above description regards the image processing according to the display characteristics of the image display device. In the case where a printing device is used as the image receiver device, the image processing may be carried out according to the printing characteristics of the printing device.

In one preferable application of the present invention, the image transmitter device receives processing characteristic information regarding image processing characteristics of the image receiver device from the image receiver device, and changes over the series of image processing executed therein according to the processing characteristic information. The processing characteristic information includes, for example, the type, the processing speed, and the memory capacity of the image receiver device.

In the case where an image output device is used for the image receiver device, the image transmitter device receives output characteristic information regarding image output characteristics of the image output device from the image output device and changes over the series of image processing executed therein according to the output characteristic information. The output characteristic information includes, for example, the type, the resolution, and the adopted color system of the image receiver device. Especially when an image display device is used for the image receiver device, the output characteristic information may include the adjusted contrast value and the environmental brightness. The environmental brightness may be measured with a sensor attached to the image receiver device or may be input manually by the user. In the case of a liquid crystal display device, the output characteristic information may include the on-off state of the backlight.

The changeover of the details of the image processing according to such information ensures improvement in picture quality with regard to diverse image receiver devices and under diverse working environments. The changeover may be attained by changing the series of image processing to be executed or by changing the parameters for specifying the details of the image processing. The former application selectively carries out both or either one of the tone correction process and the color reduction process according to the processing characteristic information or the output characteristic information. The latter application changes over the tone curve used for the tone correction according to the processing characteristic information or the output characteristic information.

The changeover of the details of the image processing is readily implemented by mapping the processing characteristic information or the output characteristic information to the details of the image processing to be executed or the parameters and storing the mapping. The information transmitted from the image receiver information may include the parameters used for the image processing. For example, a tone curve used for the tone correction may be transmitted from the image receiver device. This arrangement advantageously ensures the flexible specification of the image processing that is adequately executed by the image receiver device.

The present invention is also directed to the image receiver device, that is in combination with the image transmitter device discussed above.

The image receiver device of the present invention includes a receiver unit, an image processing unit, and a process controller. The receiver unit receives a series of data including image data via a communication path, which may be via wire or wireless. The communication path may be a wide-area network like the Internet, a LAN, or a local network between the image transmitter device and the image receiver device.

The image processing unit causes the input image data to be subjected to a specified series of image processing. The image processing includes a series of processing required for the image output as well as another series of processing to enhance the picture quality according to the characteristics of the image receiver device. It is not required that the image processing executed by the image processing unit of the image receiver device is equivalent to the image processing executed by the image transmitter device described above. The image processing executed by the image processing unit of the image receiver device is specified in an allowable range by the processing capacity of the image receiver device.

The process controller controls the series of image processing to be executed by the image processing unit, if any, in response to a preset control signal included in the series of received data. The control signal is generated by the image transmitter device. The process controller determines whether or not the input image data has previously undergone the image processing and identifies the details of the image processing previously executed, if any. In the case where no image processing has been carried out, the process controller flexibly applies a diversity of image processing executable by the image processing unit, in order to enhance the picture quality. In the case where some image processing has been carried out in advance, the process controller controls the image processing to be executed by the image processing unit, in order to prevent undesirable deterioration of the picture quality due to the interaction with the previously executed image processing.

In the latter case, one applicable procedure identifies the details of the image processing previously executed for the input image data in response to the control signal, and prohibits the image processing unit from executing an equivalent series of image processing. This arrangement effectively prevents deterioration of the picture quality, due to the duplicated execution of the identical image processing by the image transmitter device and the image receiver device.

In one application, the image receiver device with an image display unit having a smaller number of expressible tones than a number of tones included in the master image data carries out the dispersed-type color reduction process. In this application, it is preferable that the process controller prohibits the image processing unit from executing color reduction, when receiving the control signal that shows the image data has undergone the color reduction process. This arrangement desirably prevents the same color reduction process from being carried out in a duplicated manner.

In another application, the image receiver device with an image display unit having a non-linearity of expressible tones carries out the tone correction process. In this application, it is preferable that the process controller prohibits the image processing unit from executing an equivalent color correction process, when receiving the control signal that shows the image data has undergone the color correction process. This arrangement desirably prevents the same color correction process from being carried out in a duplicated manner.

The technique of the present invention is also applicable to a system where the image transmitter device is connected to a plurality of image receiver devices. In this application, the image transmitter device receives a specification of each image receiver device, changes over the details of image processing executed therein according to the input specification, and transmits processed image data to the corresponding image receiver device. A control signal for controlling details of image processing executed in each image receiver device is mapped to the processed image data to be transmitted. The specification of the image receiver device may include at least part of the processing characteristic information and the output characteristic information discussed previously. This arrangement ensures the image output according to the specification of each image receiver device under the environment where the plurality of image receiver devices are connected to the image transmitter device.

The technique of the present invention is not restricted to the image transmitter device or the image receiver device, but may be attained by a diversity of other applications. Such applications include a method of transmitting image data via the communication path to the image receiver device having the image processing functions and a method of generating image data to be transmitted. The applications also include a method of outputting images in the image receiver device, a method of controlling the image receiver device, and an image processing method in the image receiver device, as well as a pre-processing method of image data prior to transmission. The present invention may also be constructed as computer programs that attain these functions, a diversity of signals that are equivalent to such computer programs, and recording media in which such computer programs are recorded in a computer readable manner.

Typical examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

These and other objects, features, aspects, and advantages of the present invention will become more apparent from the following detailed description of a preferred embodiment with the accompanying drawings.

BRIEF DESCRIPTION OF THE DRAWINGS

FIG. 3 is a table showing the selective use of the image processing functions of the server and the cellular phone;

DESCRIPTION OF THE PREFERRED EMBODIMENTS

Figure 1:
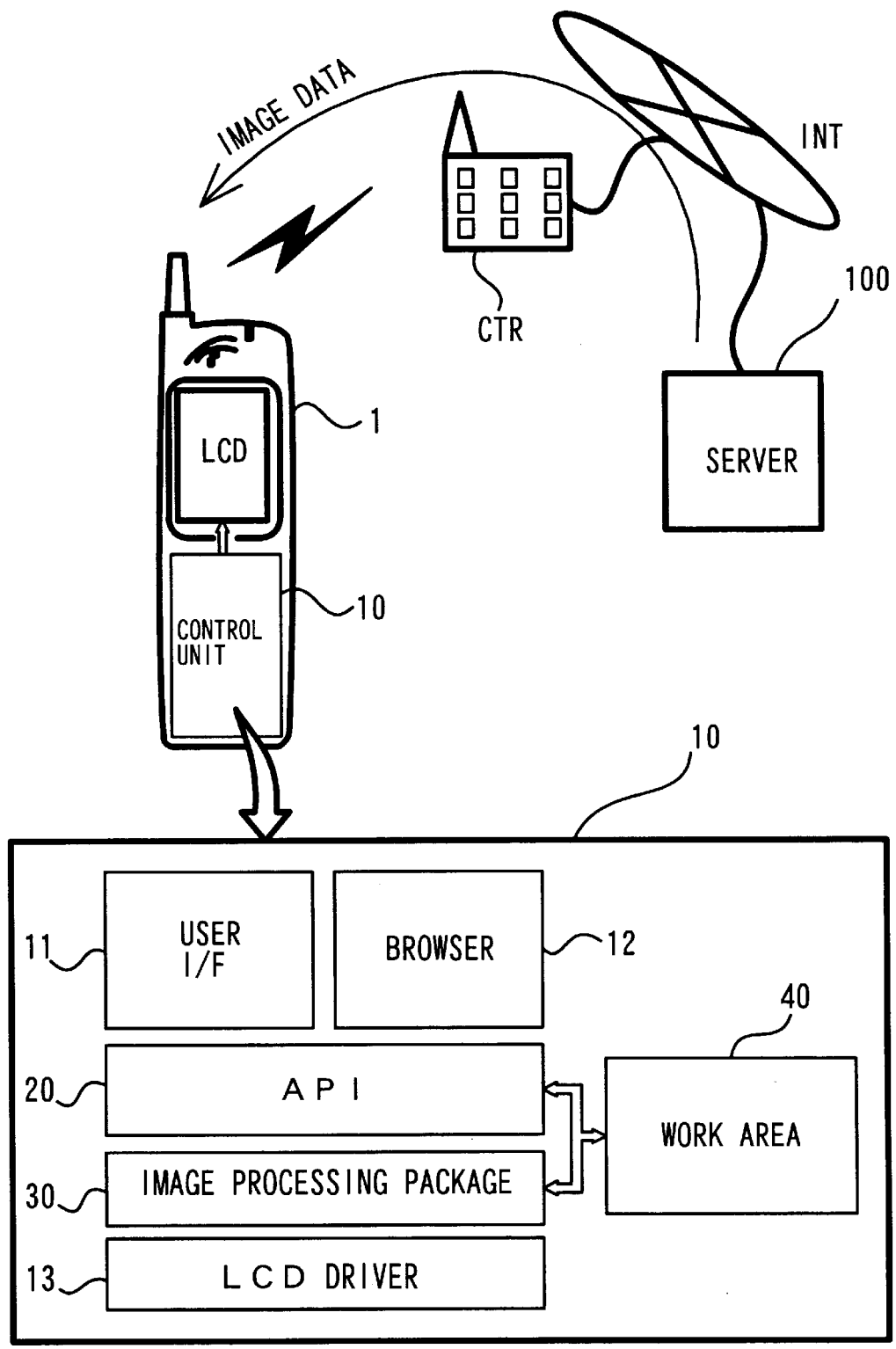
FIG. 1 illustrates the construction of an image transmission system including a server and a cellular phone in one embodiment of the present invention.

One mode of carrying out the present invention is discussed below in the following sequence:
A. Construction of System
B. Method of Selectively Using Image Processing Functions
  B1. Image Processing in Server
  B2. Image Processing in Terminal
C. Image Processing
  C1. Tone Correction Process
  C2. Halftoning Process by Dither Method
D1. Modification (1)
D2. Modification (2)
A. Construction of System FIG. 1 illustrates the construction of an image transmission system in one embodiment of the present invention. In the image transmission system of this embodiment, a cellular phone 1 being capable of accessing the Internet INT is used as an image receiver device. The cellular phone 1 gains access to the Internet INT via radio communication with a base station CTR, and downloads image data from a server 100 connecting with the Internet INT. The downloaded image data are processed by a control unit 10 incorporated in the cellular phone 1, and are displayed on a liquid crystal panel LCD. The control unit 10 is constructed as a microcomputer including a CPU and memories and carries out image processing and controls the display according to software programs.

The software configuration for operations of the control unit 10 is also illustrated in FIG. 1. An LCD driver 13 is present on the lower most layer as a software package for directly driving the hardware or the liquid crystal panel LCD. This software package has the function of controlling a transmission voltage applied to each pixel on the liquid crystal panel LCD according to image data.

An image processing package 30 is provided on its upper layer. The image processing package 30 is constructed as a software package depending upon the liquid crystal panel LCD, and converts master image data into a specific data format corresponding to the characteristics of the liquid crystal panel LCD.

Series of image processing include a color conversion process to convert the color system of the master image data into another color system applied on the liquid crystal panel LCD, a tone correction process to adjust the contrast and the brightness of the image data, and a halftoning process to reduce the number of tones of the mater image data into a specific number of tones displayable by the liquid crystal panel LCD. The tone correction process restricts the distribution in a specific tone range that often causes quasi-contours due to characteristics of the liquid crystal panel LCD, and shifts the distribution of the specific tone range into a peripheral tone range. The halftoning process does not carry out simple color reduction that unequivocally allocates color subtracted tone values to the tone values of the master image data, but adopts the distributed halftoning. These series of image processing are specified by taking into account the display characteristics of the liquid crystal panel LCD. Execution of the image processing effectively improves the picture quality of displayed images on the liquid crystal panel LCD.

A user interface 11 and a browser 12 that are present on the upper most layer utilize this image processing package 30 to perform the series of image processing. The user interface 11 functions to display windows for operating the cellular phone 1 on the liquid crystal panel LCD. The browser 12 functions to display Web pages downloaded from the Internet INT. Both the user interface 11 and the browser 12 have little dependency on the hardware and are the general purpose software packages having generalization to a certain extent. An application programming interface (API) 20 is provided as a mediation software package that enables the upper-layered, general purpose software package to utilize the lower-layered software package having the dependency on the hardware. In response to an instruction of image processing output from the upper-layered software package to the API 20 according to a preset general purpose format, the API 20 utilizes the image processing package 30 to carry out the instructed image processing.

In the structure of this embodiment, the series of image processing mentioned above may be executed in the server 100. The API 20 analyzes received image data and identifies the details of the pre-processing, that is, the series of image processing already executed. The API 20 adequately selects the series of image processing to be executed in the cellular phone 1, based on the identified details of the preprocessing, and carries out only a required series of processing for display of images having the improved picture quality. The API 20 may be provided as an individual software package suitable for the details of the image processing and the image processing package 30. In this embodiment, however, the API 20 has the general purpose basic structure and is usable for diverse image processing by simply changing the specified parameters and the functions of the applied image processing package 30. The API 20 and the image processing package 30 utilize a work area 40 dynamically provided on the memory of the control unit 10 for the processing. area 40 dynamically provided on the memory of the control unit 10 for the processing.

Figure 2:
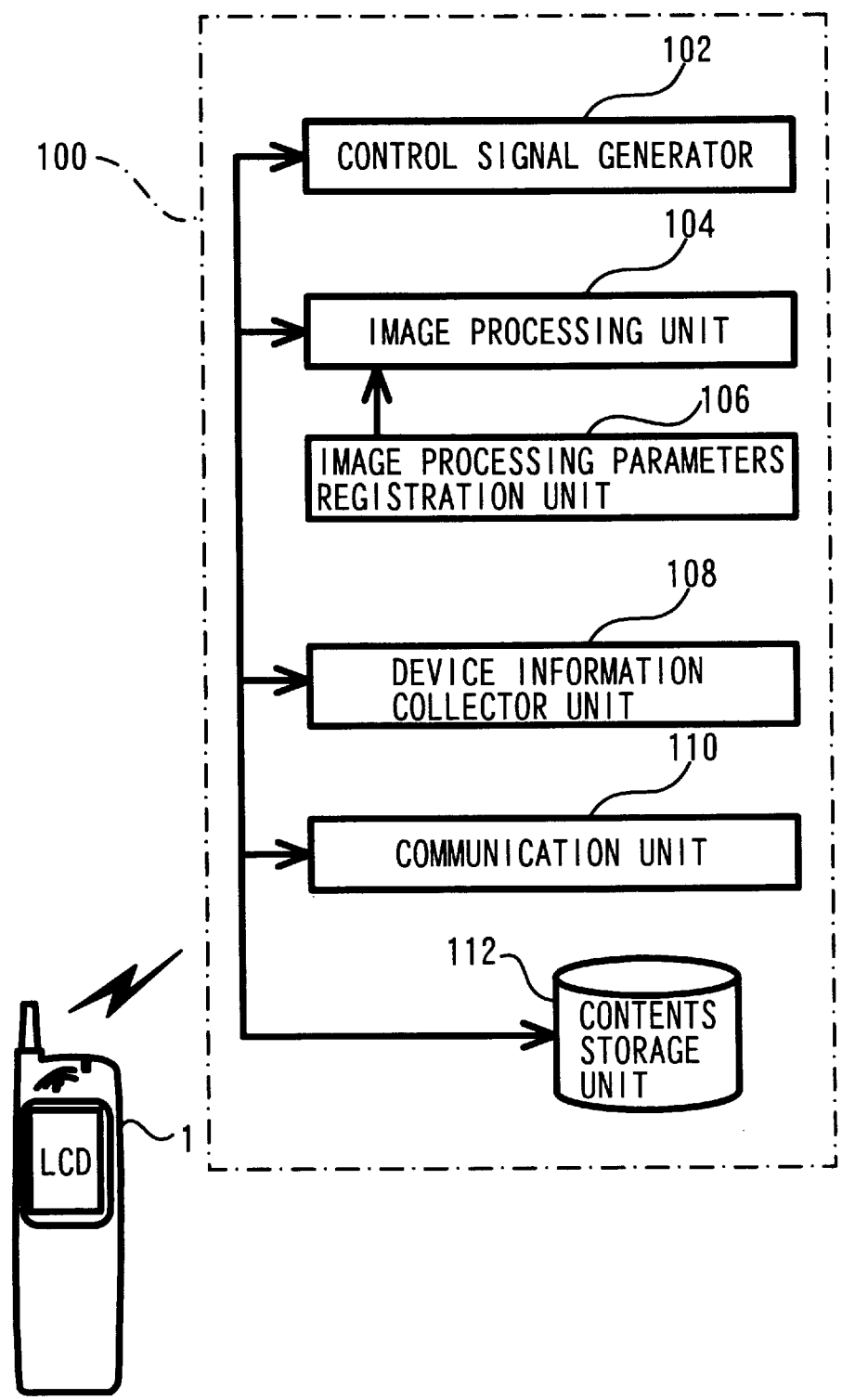
FIG. 2 shows functional blocks of the server.

FIG. 2 shows functional blocks of the server 100. These functional blocks are constructed as software packages in the server 100. In the structure of the embodiment, all the functional blocks are provided in the single server 100. These functions may, however, be executed in a distributed manner by a plurality of servers.

A communication unit 110 functions to communicate with external devices connected via a network. The communication unit 110 takes charge of conversion between data input into and output from the server 100 and specific formats corresponding to diverse protocols applied for communication via the network. Contents to be supplied from the communication unit 110 are stored in a specific file format like HTML in a contents storage unit 112. The server 100 is not restricted to the system that supplies internally stored contents, but may be constructed as a portal system that processes externally input contents and supplies the processed contents to the cellular phone 1.

An image processing unit 104 causes image data included in each content to undergo series of image processing prior to the supply, according to the requirements. The series of image processing executed here are similar to the series of image processing executed in the cellular phone 1. Namely the image processing unit 104 may carry out the image processing in place of the cellular phone 1, according to the requirements. The following description of the embodiment is on the assumption that the series of image processing executed by the image processing unit 104 are identical with the series of image processing executed by the image processing package 30 incorporated in the cellular phone 1. There may, however, be a difference in details of the image processing, based on the different processing capacities of the server 100 and the cellular phone 1. The device having the poorer processing capacity carries out simplified image processing, which has slightly lower effects of improving the picture quality. The device having the richer processing capacity, on the other hand, carries out complicated image processing, which has higher effects of improving the picture quality.

The server 100 supplies contents to diverse types of cellular phones 1. The image processing unit 104 is accordingly required to change over the details of the image processing according to the type of the cellular phone 1. A device information collector unit 108 and an image processing parameters registration unit 106 are provided in the server 100 to attain the changeover.

The device information collector unit 108 collects device information regarding the cellular phone 1 via the communication. The device information identifies the type of the cellular phone 1 and includes diverse pieces of information relating to display characteristics, such as the adjustment value of the contrast on the liquid crystal panel LCD and the on-off state of a backlight of the liquid crystal panel LCD. Which pieces of information to be collected are adequately set on the system design by taking into account the effects on the picture quality.

Parameters for specifying the details of the processing executed by the image processing unit 104 according to the collected device information are registered in the image processing parameters registration unit 106. The identification of the type of the cellular phone 1 specifies the resolution of the liquid crystal panel LCD, the number of expressible tones in each pixel, and the relationship between the tone value and the brightness. The number of tones after the color reduction process and the tone curve used for the tone correction are stored as processing parameters according to these specified pieces of information. A specific piece of information for specifying the details of the image processing to be executed by the server 100 is also stored by taking into account the details of the image processing executable by the cellular phone 1 and the processing capacity of the cellular phone 1. For example, with regard to a certain type of the cellular phone 1 that requires execution of the halftoning process by the server 100, a flag representing execution of the halftoning process is set in the image processing parameters registration unit 106. With regard to another type of the cellular phone 1 that requires execution of the halftoning process by the cellular phone, on the other hand, a flag representing prohibition of the halftoning process is set in the image processing parameters registration unit 106.

When the image processing unit 104 executes the image processing, it is required to notify the cellular phone 1 of the details of the image processing. Such notification effectively prevents the cellular phone 1 from executing the halftoning process in a duplicated manner after the halftoning process executed by the image processing unit 104. The duplicated halftoning process significantly damages the tone expression of a resulting image and undesirably lowers the picture quality of the resulting image. A control signal generator 102 functions to generate a control signal for the notification.

The cellular phone 1 may receive contents from a server without the image processing unit 104 or the control signal generator 102. The control signal generator 102 generates the control signal, while keeping the upper compatibility with the image data supplied from such a server. The arrangement of this embodiment notes the fact that contents are generally created in a tagged language like HTML and defines a new tag for notifying the cellular phone 1 of the details of the image processing. The cellular phone 1 determines that a content without this tag has not yet been subjected to the image processing, and carries out the image processing of this content. This arrangement thus ensures the upper compatibility.

The control signal is not required to keep the upper compatibility, when consideration is given to only the communication between the server 100 and the cellular phone 1 having the structures illustrated in this embodiment. In such cases, a unique control signal and a protocol for transmission of this unique control signal may be defined to attain flexible specification of the details of the image processing. The control signal may be transmitted together with the image data or separately from the image data.

B. Method of Selectively Using Image Processing Functions

The following describes the image processing process executed in this embodiment when the server 100 supplies image data to the cellular phone 1. As mentioned previously, both the server 100 and the cellular phone 1 of the embodiment have the image processing capacities. A diversity of servers and cellular phones are, however, involved in the actual communications. The communication between the server and the cellular phone is mainly classified into the following four cases:

Case 1: Communication between the server 100 and the cellular phone 1 of the embodiment;

Case 2: Communication between the server 100 of the embodiment and a cellular phone with no capacity of image processing;

Case 3: Communication between the cellular phone 1 of the embodiment and a server with no capacity of image processing; and Case 4: Communication between a server with no capacity of image processing and a cellular phone with no capacity of image processing.

The case 4 corresponds to the conventional communications and is thus not specifically described here. The method of the embodiment selectively uses the image processing functions of the server 100 and the cellular phone 1 to attain the adequate image processing in the cases 1 to 3.

FIG. 3 is a table showing the selective use of the image processing functions of the server and the cellular phone. For convenience of explanation, it is assumed that image data are subjected to two series of image processing 'A: tone correction process' and 'B: halftoning process' executed in this order.

With regard to each series of image processing, there are mainly five possible relations between the image processing capacities of the server and the cellular phone. The tone correction process is carried out in five possible classes; that is, a class A1 in which the server does not have the processing capacity, a class A5 in which the cellular phone or the terminal does not have the processing capacity, and classes A2 to A4 in which both the server and the terminal have the processing capacities. The last classes in which both the server and the terminal have the processing capacities include the class A2 in which the processing capacity of the server is lower than that of the terminal, the class A3 in which the processing capacity of the server is equivalent to that of the terminal, and the class A4 in which the processing capacity of the server is higher than that of the terminal. The class A1 corresponds to the case 3, the class A5 corresponds to the case 2, and the classes A2 to A4 correspond to the case 1. Similar classification may be applied for the halftoning process.

The table of FIG. 3 specifies the series of processing executed by the server and the terminal according to the image processing capacities of the server and the terminal. The upper left side of the slash shows the image processing executed by the server, whereas the lower right side of the slash shows the image processing executed by the terminal. The symbols A and B respectively represent the tone correction process and the halftoning process.

For example, in the case where the server is not capable of either the tone correction process or the halftoning process (that is, in a box A1-B1), the server does not carry out any image processing, and the terminal carries out both the tone correction process and the halftoning process. Such settings are also adopted in a range where the processing capacity of the server is lower than the processing capacity of the terminal (that is, in boxes A1-B2, A2-B1, and A2-B2). This is because execution of the processing on the side having the higher processing capacity effectively shortens the processing time.

In the technique of this embodiment, the terminal also executes both the tone correction process and the halftoning process in a range where the processing capacity of the server is equivalent to the processing capacity of the terminal (that is, in boxes A1-B3, A2-B3, A3-B1, A3-B2, and A3-B3). There is a possibility that the processing is concentrated on the server that communicates with a number of terminals. Execution of the processing by the terminal thus ensures the higher-speed processing.

In a range where the processing capacity of the server is higher than the processing capacity of the terminal with regard to only the tone correction process (that is, in boxes A4-B1 to A4-B3 and A5-B1 to A5-B3), the server executes the tone correction process, while the terminal carries out the halftoning process. In a range where the processing capacity of the server is higher than the processing capacity of the terminal with regard to only the halftoning process (that is, in boxes A1-B4 to A3-B4), the terminal carries out both the tone correction process and the halftoning process. The tone correction process and the halftoning process are carried out in this order. The server executing the halftoning process is thus required to also carry out the tone correction process. It is, however, not desirable that the server having the lower processing capacity carries out the tone correction process.

In a range where the processing capacity of the server is higher than the processing capacity of the terminal with regard to both the tone correction process and the halftoning process (that is, in boxes A4-B4, A5-B4, A4-B5, and A5-B5), the server carries out all the processing.

In the above manner, the technique of the embodiment changes the details of the image processing carried out by the server and the terminal according to the processing capacities of the server and the terminal. The table of FIG. 3 shows the selections to shorten the processing time based on only the processing capacities with regard to the two series of processing. The similar classification policy may be applied for the three or more series of processing. In the case where the quantity of data is varied before and after the image processing, the time required for communication may be taken into account for the selection. The selection is attained by a control operation discussed below.

B1. Image Processing by Server

Figure 4:
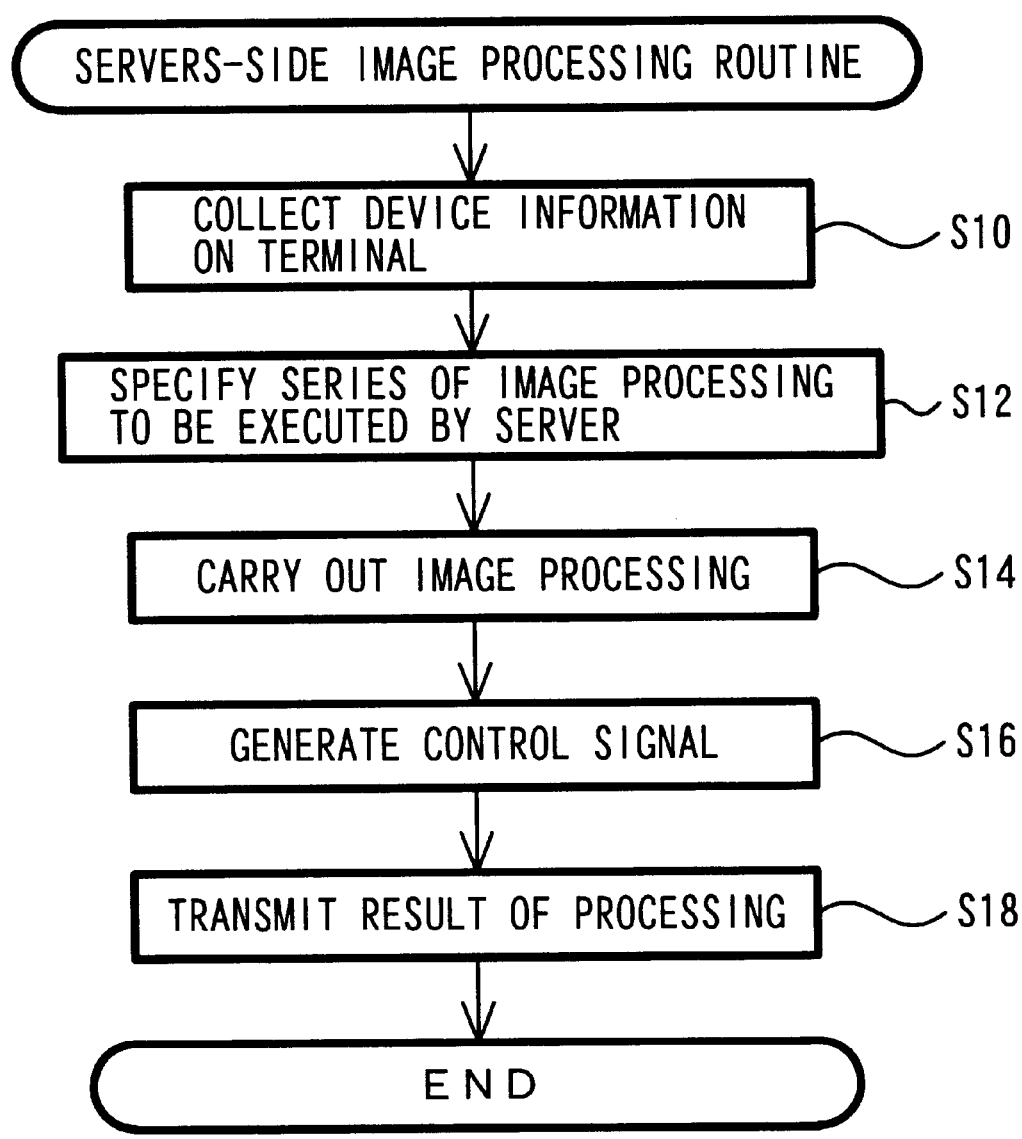
FIG. 4 is a flowchart showing a server-side image processing routine.

FIG. 4 is a flowchart showing a server-side image processing routine, which is mainly executed by the image processing unit 104 incorporated in the server 100. The process enters this routine when the cellular phone 1 gains access to the server 100 and gives an instruction to download a content including image data.

The server 100 first collects device information regarding a terminal that communicates with the server 100 at step S10. Here the device information identifies the type of the terminal. Identification of the type of the terminal specifies the processing capacity of the terminal, that is, determines whether or not an image processing package is provided in the terminal. At subsequent step S12, the server 100 sets a series of image processing to be executed by the server 100 according to the criteria shown in the table of FIG. 3, based on the result of the specification. In this embodiment, the image processing unit 104 refers to the table of FIG. 3 stored in the image processing parameters registration unit 106 to specify the details of the image processing.

The server 100 then actually carries out the specified series of image processing at step S14. The series of image processing includes the tone correction process and the halftoning process, which will be discussed later.

The server 100 subsequently generates a control signal according to the executed series of image processing at step S16. The control signal is used to notify the terminal of the details of the image processing executed by the server 100.

As mentioned previously, the technique of the embodiment uses a tag uniquely defined as the control signal. The tag specifies the details of the processing, that is, execution of both the tone correction process and the halftoning process, execution of only the tone correction process, or no execution of either processes.

The server 100 maps the tag generated at step S16 to the result of the image processing obtained at step S14 and transmits the mapping to the terminal at step S18. The tag may be mapped to the result of the image processing, for example, by inserting the tag immediately before another tag that identifies image data as the object of image processing in an HTML file.

B2. Image Processing by Terminal

Figure 5:
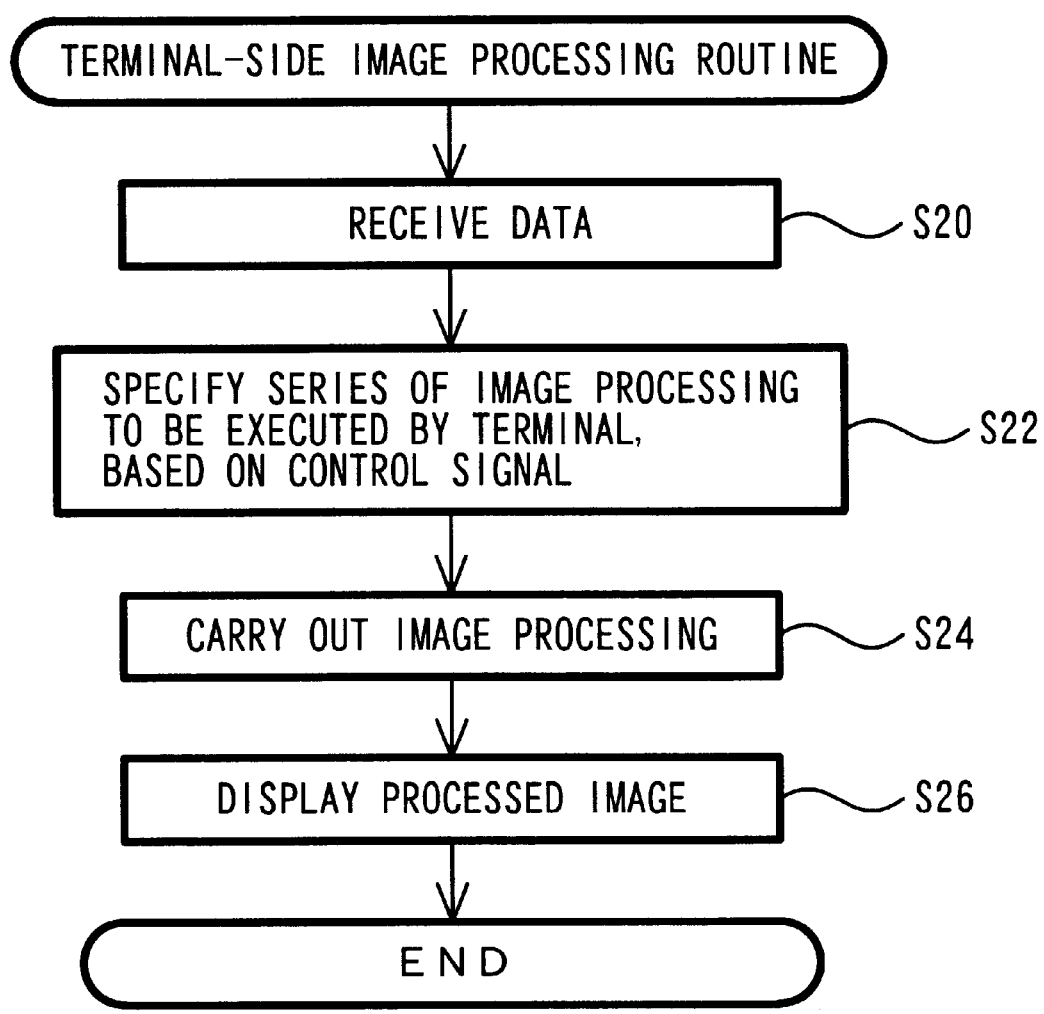
FIG. 5 is a flowchart showing a terminal-side image processing routine.

FIG. 5 is a flowchart showing a terminal-side image processing routine. The terminal receives data sent from the server at step S20 and specifies a series of image processing to be executed by the terminal, based on the control signal at step S22. In the case where the server 100 has carried out some image processing, the received data includes the tag as the control signal. The terminal analyzes this tag to identify the series of image processing executed by the server 100 and specifies the series of processing to be executed by the terminal. In the example of FIG. 3, when the server 100 has carried out only the tone correction process, the tag prohibits execution of the tone correction process by the terminal and requires the terminal to execute only the halftoning process. When the server 100 has carried out both the tone correction process and the halftoning process, the tag prohibits execution of any image processing by the terminal.

The data received from a server other than the server 100 of the embodiment, that is, from a server having no image processing capacity, does not include the tag as the control signal. In such cases, the terminal determines that no series of image processing has yet been carried out. The terminal accordingly carries out both the tone correction process and the halftoning process.

After specifying the series of image processing to be executed by the terminal based on the execution or non-execution of the processing by the server, the terminal actually carries out the specified series of image processing at step S24 and displays a resulting processed image at step S26. The procedure of image processing will be discussed later.

C. Image Processing

The image processing carried out in this embodiment is discussed below. The server and the terminal follow the same procedure for the image processing. The following description accordingly regards the common procedure to the server and the terminal, although the technique of the embodiment is not restricted to the identical image processing routine executed by both the server and the terminal. Different image processing routines may be adopted according to the structures of the server and the terminal. The details of the tone correction process or the halftoning process executed by the server may differ from those by the terminal.

Figure 6:
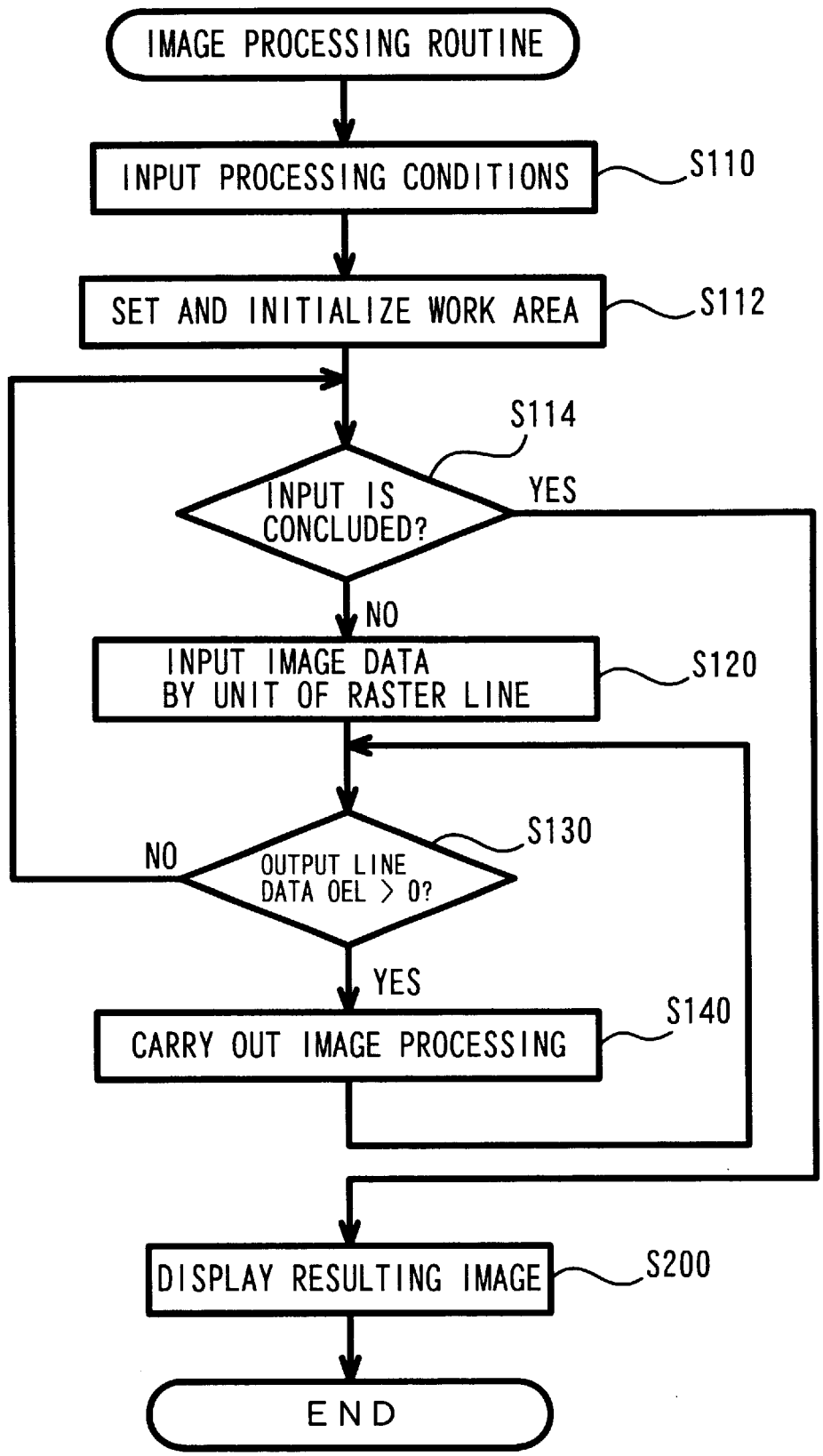
FIG. 6 is a flowchart showing the details of image processing by an API (application program interface)

FIG. 6 is a flowchart showing the details of the image processing by the API (application program interface) 20. In this embodiment, the API is provided as the general purpose image processing routine, and the image processing package used by the API is changed to implement diverse image processing. The CPU in the server or the terminal executes this image processing routine in response to an instruction to execute the image processing.

Figure 7:
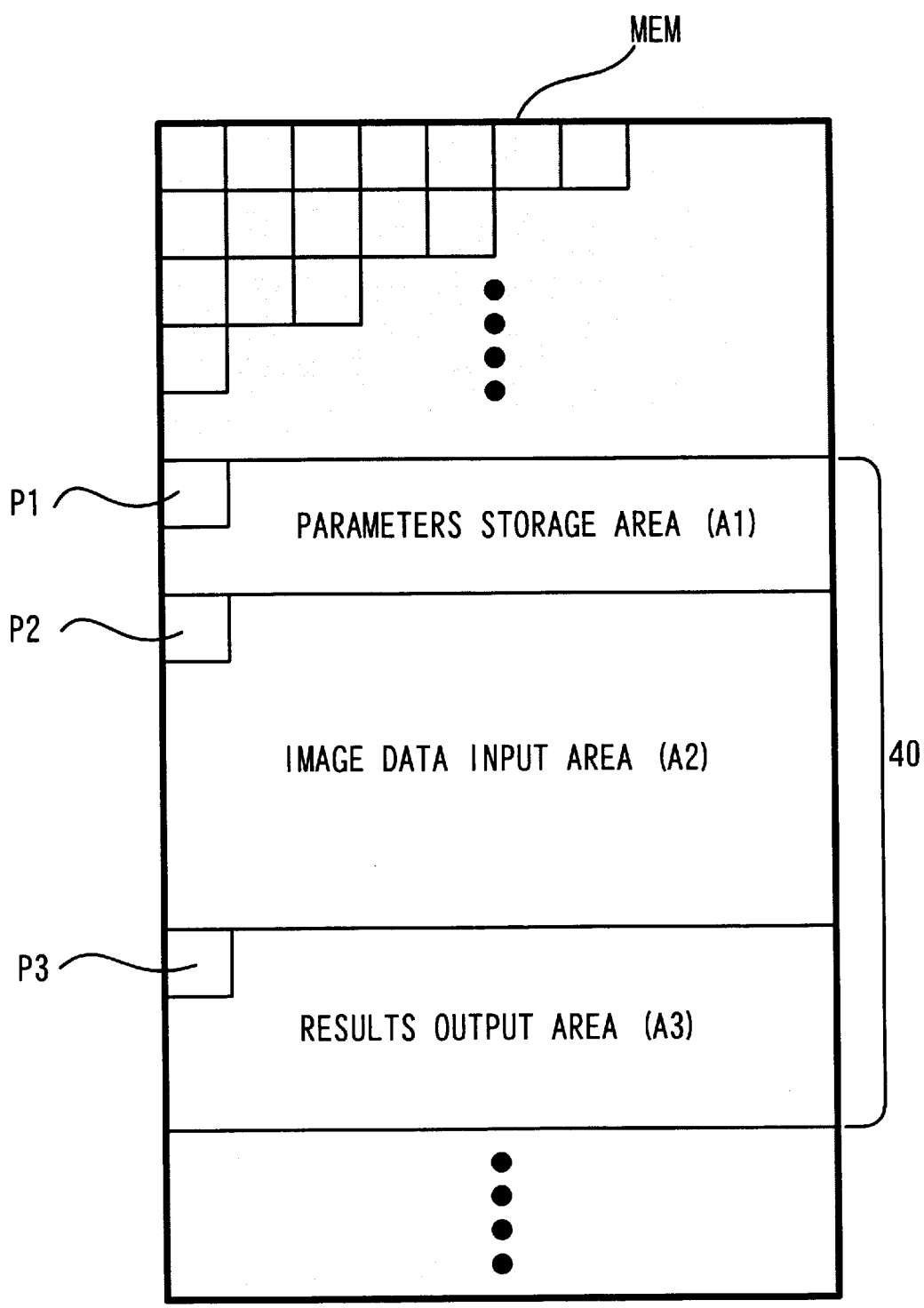
FIG. 7 shows the setting in a work area.

The CPU first inputs processing conditions, for example, the size of image data, the type of image processing to be executed, and the unit of processing at step S110, and sets and initializes the work area 40 required for the processing according to the input processing conditions at step S112. FIG. 7 shows the setting in the work area 40. Each square in FIG. 7 represents a unit of storage mapped to each address on the memory space. The work area 40 is mainly divided into three areas; a parameters storage area A1 to store the processing conditions therein, an image data input area A2 to store therein image data before the processing, and a results output area A3 from which the results of processing are output. The respective areas A1, A2, and A3 are specified by pointers P1, P2, and P3.

The CPU continues inputting image data into the image data input area A2 by the unit of a raster line at step S120 until the input of all the image data is completed at step S114. The procedure of this embodiment uses output line data OEL to determine whether or not a required quantity of data have been input for the image processing. In the case of image processing that utilizes only the tone values of individual pixels, such as the tone correction process, the number of input raster lines is output as the output line data OEL. In the case of image processing that utilizes the tone values of plural pixels over multiple raster lines for processing of each pixel, such as the error diffusion method, on the other hand, the output line data OEL takes a value of not lower than 1 at the time when data of at least 2 raster lines are input.

The CPU determines that the image processing is executable in the case of the output line data OEL>0 at step S130, and calls the image processing package corresponding to the specified series of image processing to actually execute the specified series of image processing at step S140. On completion of the image processing at step S140, the CPU deletes the processed image data and updates the output line data OEL. When it is determined at step S114 that the input and processing of all the image data is concluded, the CPU displays a resulting processed image at step S200. The program then exits from this image processing routine.

C1. Tone Correction Process

Figure 8:
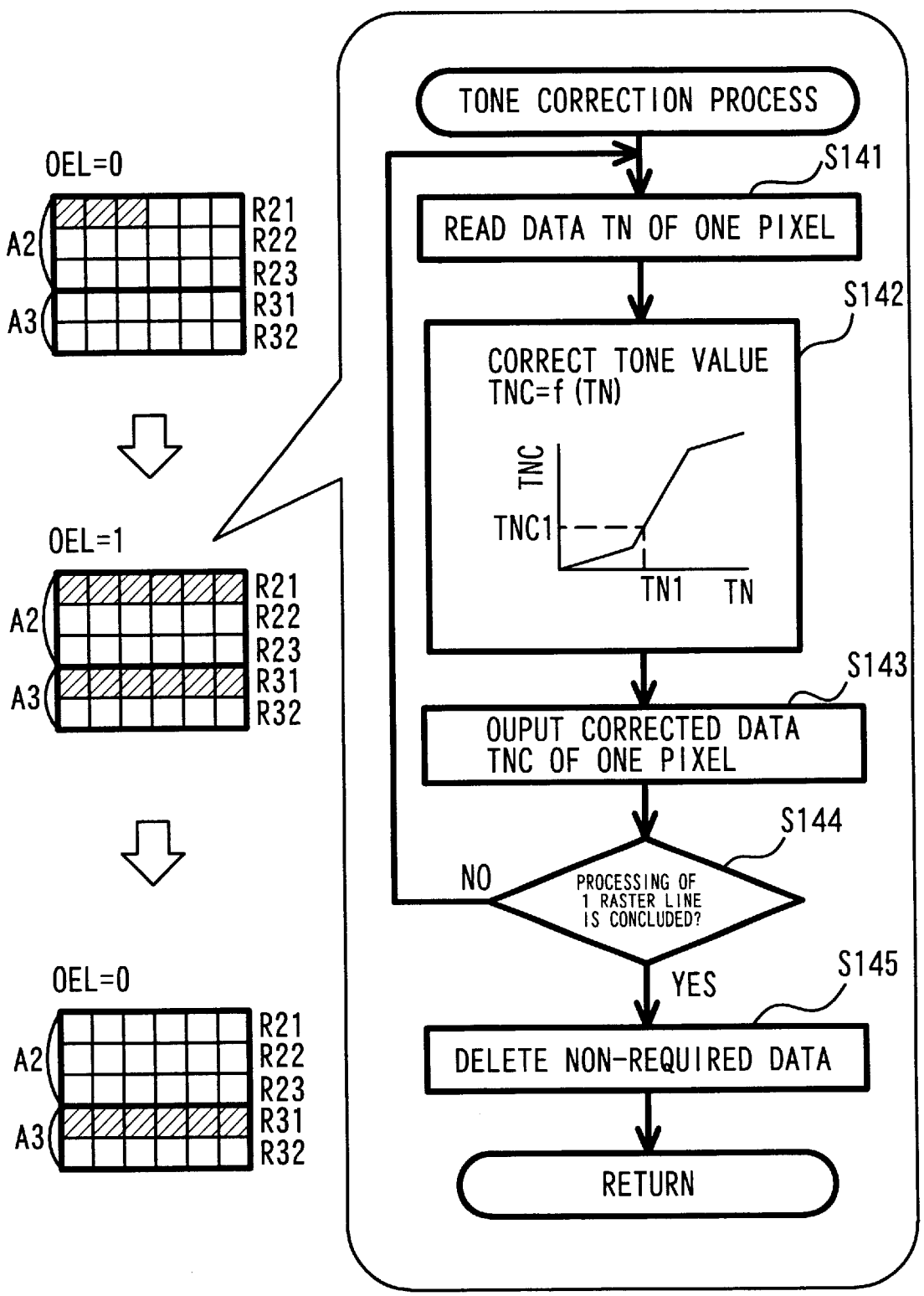
FIG. 8 shows the details of a tone correction process.

The following successively describes the details of the tone correction process and the halftoning process executed as the image processing of step S140. FIG. 8 shows the details of the tone correction process. The left half of the drawing shows data stored in the areas A2 and A3 of the work area 40. In the respective storage areas, each line of data expressed as R21 or R22 corresponds to data of one raster line in an image. Each hatched part represents an area in which data are stored.

In this embodiment, the tone correction process is carried out when the quantity of image data input by the unit of a pixel reaches data of 1 raster line (that is, at the time of a shift from the upper most row R21 to the intermediate row R22 in the drawing). The CPU reads a tone value TN of one pixel from the image data input area A2 at step S141, calculates a corrected tone value TNC according to a function f(TN) at step S142, and outputs the corrected tone value TNC of one pixel to the output area A3 at step S143.

A diversity of settings may be applied for the function f(TN) according to the details of the tone correction process. For example, to enhance the contrast, the following equation is used as the function f(TN):

$$TNC = a \cdot TN + b$$

where a and b are real number parameters for regulating the degree of enhancement of the contrast.

The function f(TN) is not restricted to the mathematical expression but may be a tone curve specifying the relationship between the input tone value TN and the corrected tone value TNC as shown in FIG. 8.

The illustrated tone curve corrects an input tone value TN1 to a smaller tone value TNC1. In the case where the display characteristics of the terminal tend to cause a quasi-contour in the vicinity of the tone value TN1, application of this tone curve restricts the distribution of the tone value TN1, thus making the quasi-contour sufficiently inconspicuous. Adjusting the real number parameters or the setting of the tone curve effectively improves the picture quality of resulting processed images according to the display characteristics of the terminal.

In this embodiment, an image processing package using the real number parameters or the tone curve set according to the display characteristics is provided in the cellular phone 1. The tone curve or the real number parameters corresponding to the type of the cellular phone are stored in the image processing parameters registration unit 106 of the server 100. The server 100 carries out the tone correction process according to the type of the cellular phone 1, based on these values stored in the image processing parameters storage unit 106.

The CPU repeats the above series of processing with regard to each pixel until the processing of one raster line is completed at step S144. The CPU then deletes the non-required data of the raster line R21 stored in the image data input area A2 at step S145. The lower most drawing on the left side of FIG. 8 shows the state after the non-required data is deleted.

C2. Halftoning Process According to Dither Method

The halftoning process is color reduction carried out when the number of expressible tones in each pixel on the liquid crystal panel LCD is smaller than the number of tones included in master image data. The dither method uses a threshold value matrix called a dither matrix for the halftoning process and expresses multiple tones based on a distribution of pixels having respective tone values. The following description is on the assumption that a master image of 256 tones is subjected to color reduction to 5 tones.

Figure 9:
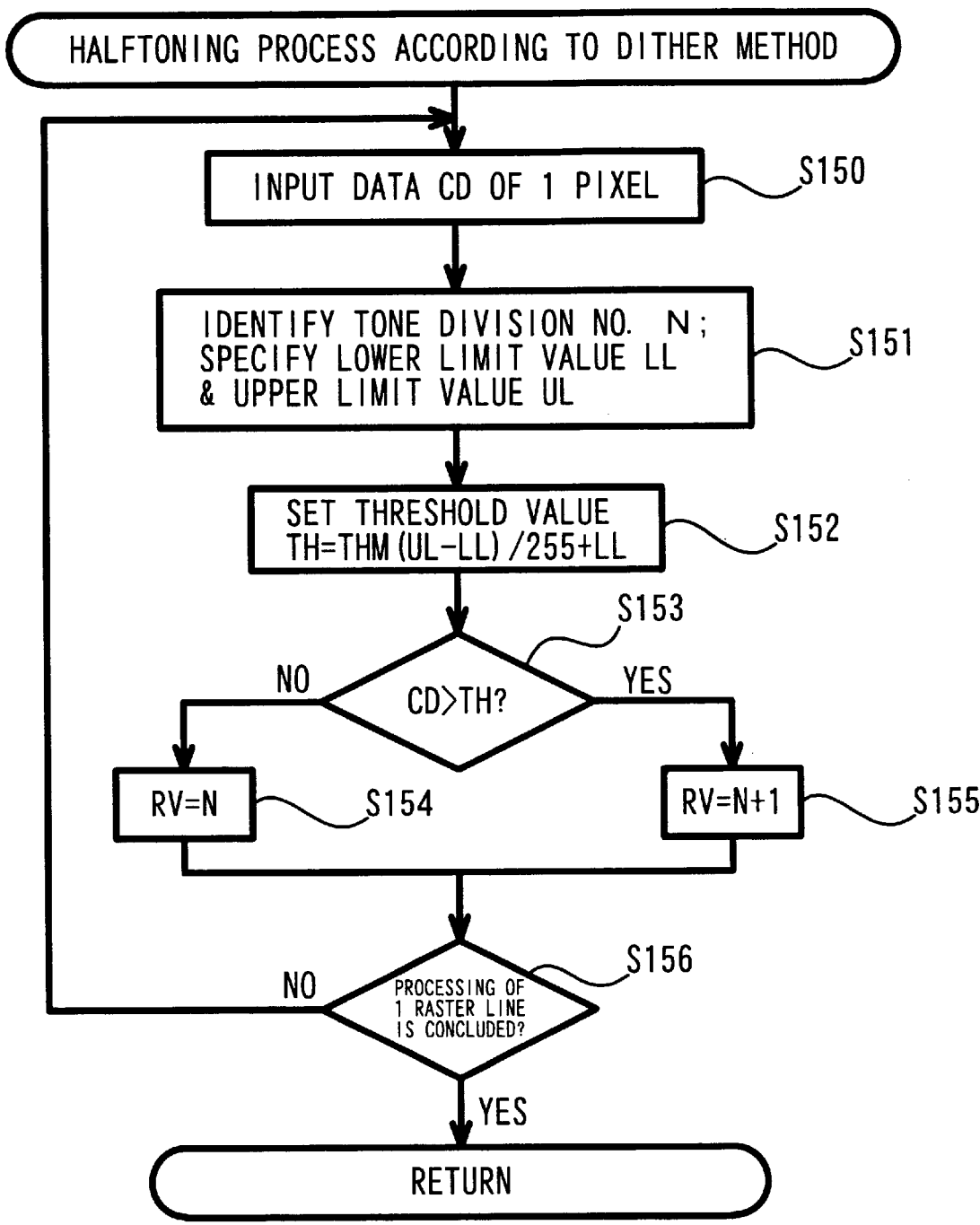
FIG. 9 is a flowchart showing a halftoning process according to the dither method.
Figure 10:
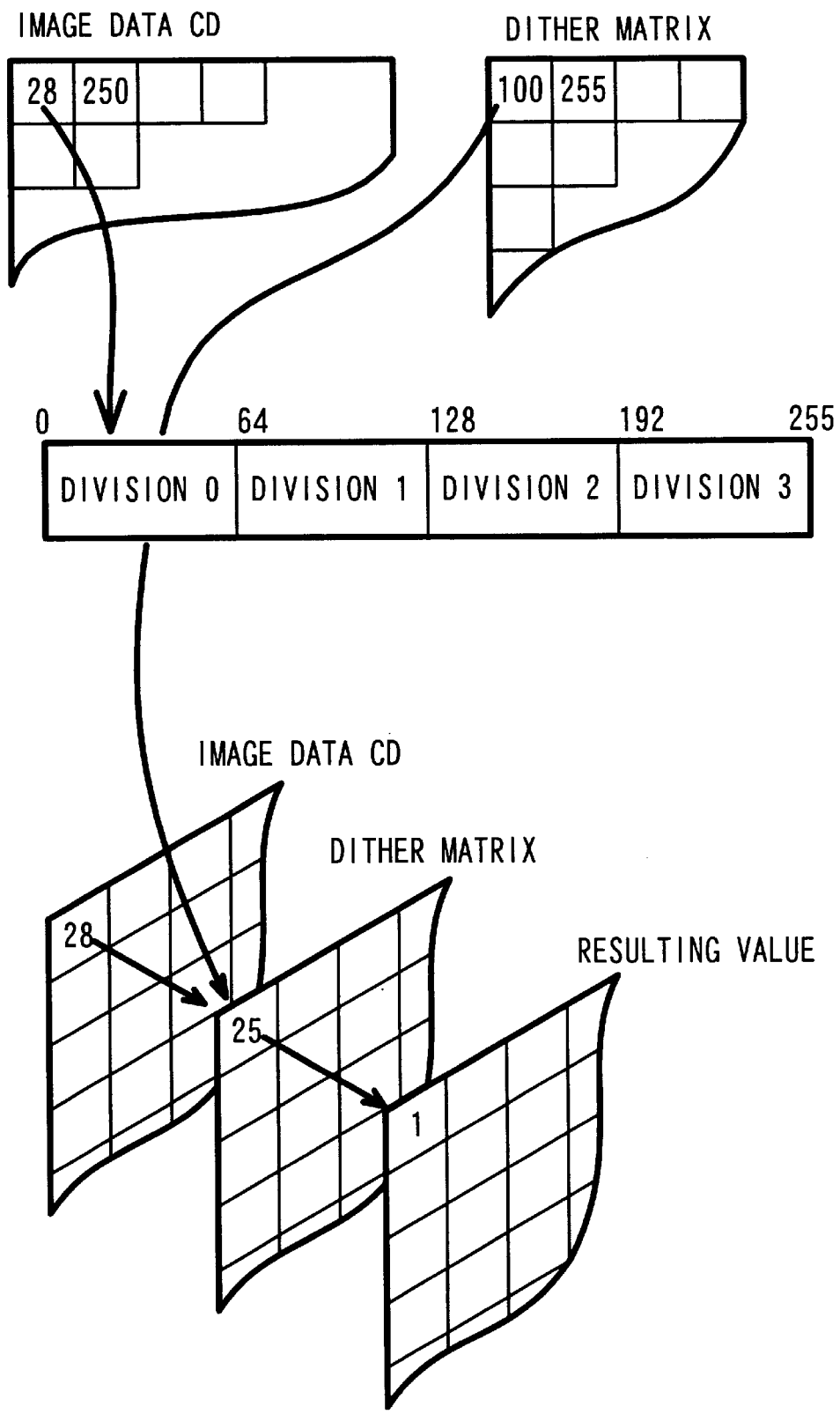
FIG. 10 shows the flow of processing in the dither method.

FIG. 9 is a flowchart showing the halftoning process according to the dither method. FIG. 10 shows the flow of processing in the dither method. When the program enters the halftoning process according to the dither method, the CPU first reads tone data CD of one pixel from the image data input area A2 at step S150, and subsequently identifies a tone division number N according to the value of the input image data CD and specifies a lower limit value LL and an upper limit value UL of the identified tone division at step S151.

Tone divisions are shown in the middle of FIG. 10. The procedure of this embodiment carries out color reduction to 5 tones, so that the tone range of the master image (the tone values of 0 to 255) is divided into four equal portions expressed as tone divisions 0 to 3. The tone division number N is assigned to each tone division in the ascending order of the tone values for the purpose of identification. As shown in FIG. 10, the tone division 0 includes tone values 0 to 63, the tone division 1 includes 64 to 127, the tone division 2 includes 128 to 191, and the tone division 3 includes 192 to 255. For example, when the input image data CD has a tone value 28, which is included in the tone division 0, the identified tone division number N is equal to 0. In this case, the lower limit value LL and the upper limit value UL of the identified tone division are respectively equal to 0 and 63.

The CPU subsequently sets a threshold value TH in a range corresponding to the specified tone division at step S152. The dither method extracts a threshold value THM from a preset dither matrix. Part of the dither matrix is illustrated in the upper portion of FIG. 10. In this embodiment, a 4×4 matrix is applied for the dither matrix. The dither matrix has threshold values, which are selected out of the range of 0 to 255 in an unbiased manner, as its entries. The halftoning process uses a threshold value stored at a position corresponding to each pixel of interest in the dither matrix. In the example of FIG. 10, the upper left threshold value 100 in the dither matrix is used to process the upper left pixel of the image data CD (the tone value 28).

The halftoning process is carried out on the basis of the tone division. It is accordingly required to correct the threshold value THM extracted from the dither matrix in the range of 0 to 255 to a threshold value TH in a range corresponding to the specified tone division. The process of step S152 implements such correction and calculates the corrected threshold value TH from the threshold value THM extracted from the dither matrix according to the following equation:

$$TH=THM(UL-LL)/255+LL$$

As shown in FIG. 10, mapping of the threshold value THM=100 to the tone division 0 according to the above equation gives the threshold value TH=25.

The CPU compares the calculated threshold value TH with the tone value CD of the input image data at step S153. When the input tone value CD is not greater than the threshold value TH, a value N is set to a resulting value RV at step S154. When the input tone value CD is greater than the threshold value TH, on the other hand, a value (N+1) is set to the resulting value RV at step S155. In the example of FIG. 10, since the input tone value 28 is greater than the calculated threshold value 25, a value '1' (=the tone division number N=0+1) is set to the resulting value RV. This resulting value RV represents the tone value after the color reduction. In the tone division 0, the tone value after the color reduction is set either equal to 0 or 1, based on the comparison between the input tone value CD and the calculated threshold value TH. In a similar manner, the tone value after the color reduction is set equal to either 1 or 2 in the tone division 1, either 2 or 3 in the tone division 2, and either 3 or 4 in the tone division 3.

The CPU repeats above series of processing until the output of one raster line is concluded at step S156. On completion of the processing, the CPU deletes non-required data and updates the output line data OEL. The program then exits from the halftoning process routine. Although the above description regards the color reduction to 5 tones, the same processing flow is applicable to any number of tones.

The number of tones after the color reduction depends upon the number of expressible tones by the liquid crystal panel LCD. In this embodiment, the image processing package provided in the cellular phone 1 attains color reduction to a specific number of tones corresponding to its display characteristics. The number of tones after the color reduction specified according to the type of the cellular phone 1 is registered in the image processing parameters registration unit 106 of the server 100. The server 100 executes the halftoning process according to the type of the cellular phone 1, based on this value registered in the image processing parameters registration unit 106.

The image processing is not restricted to the halftoning process according to the dither method. The image processing may be any of other diverse techniques, for example, the process of converting the color system or the halftoning process according to the error diffusion method, to enhance the picture quality of images displayed in the cellular phone 1. Different techniques may be applied for the processing by the server 100 and that by the cellular phone 1. For example, the server 100 carries out the halftoning process according to the error diffusion method that attains the better picture quality, whereas the cellular phone 1 carries out the halftoning process according to the dither method that ensures the lighter load of processing.

The image transmission system of this embodiment discussed above selectively uses the image processing functions of the server 100 and the cellular phone 1. The server 100 does not uniformly carry out the image processing, but changes over the series of image processing according to the processing capacity and the display characteristics of the cellular phone 1 functioning as the image transmitter device. In the case where the image transmitter device is the cellular phone without the image processing capacity to enhance the picture quality, the server 100 carries out the required series of image processing to enhance the picture quality. In the case of the cellular phone having the lower image processing capacity, the server 100 also carries out the required series of image processing to shorten the processing time. When the image processing capacity of the server 100 is sufficiently higher than the image processing capacity of the cellular phone 1, the server 100 ensures execution of the more advanced processing than the processing by the cellular phone 1, so as to enable further enhancement of the picture quality. The server 100 changes over the details of the image processing according to the device information regarding the cellular phone 1, thus attaining the effective processing adequate for the display characteristics of the cellular phone 1.

The cellular phone 1 also adequately changes over the series of image processing according to the input image data. Decoding the control signal prevents the image data, which have already undergone the image processing in the server 100, from being processed by the cellular phone 1 in a duplicated manner. Namely the server 100 maps the control signal to the image data, thereby controlling the image processing executed by the cellular phone 1. Such control effectively prevents identical image data from being subjected to image processing in a duplicated manner, thus enhancing the picture quality.

When receiving non-processed image data, which have not undergone the image processing in the server 100, the cellular phone 1 carries out the required series of image processing to enhance the picture quality. Namely the object of the processing by the cellular phone 1 is data transmitted from the server 100 of the embodiment without the image processing and data transmitted from a conventional server without the image processing capacity. The cellular phone 1 changes over the series of image processing executed therein, based on the control signal. This arrangement ensures the effects of improving the picture quality to some extent with regard to image data transmitted from any server.

D1. Modification (1)

The above embodiment may be modified in various ways. In the embodiment discussed above, the series of image processing executed by the server 100 is changed according to the type of the cellular phone 1. The image processing may be changed more minutely. Even in an identical type of the cellular phone 1, the display characteristics of the liquid crystal panel are varied by the environmental brightness and the on-off state of the backlight. One modified arrangement thus makes the device information collector unit 108 receive such pieces of information affecting the display characteristics and change the image processing parameters based on the input information. The environmental brightness may be measured with a sensor attached to the cellular phone 1 or input by the user. The liquid crystal panel having the contrast adjustment function may change the image processing parameters according to the contrast adjustment value.

In order to facilitate the change of the parameters, the parameters corresponding to not only the various types of the cellular phone 1 but the diverse pieces of device information mentioned above may be stored in the image processing parameters registration unit 106. For example, a plurality of tone curves used for the tone correction may be provided according to the various types of the cellular phone 1 and multiple contrast adjustment values. Another application corrects the tone curve provided for each type of the cellular phone 1 according to the contrast adjustment value.

In the above embodiment, the parameters for specifying the details of the image processing with regard to each type of the cellular phone 1 are stored in the image processing parameters registration unit 106 of the server 100. These parameters may alternatively be received from the cellular phone 1 as device information. For example, the tone curve may be received from the cellular phone 1 and used for the tone correction. In this arrangement, each server is not required to store the information regarding all the types of the cellular phone 1. This effectively relieves the maintenance loading of the server in response to each increase in number of the types of the cellular phone 1. This arrangement also enables the cellular phone 1 to readily reflect the modification of the tone curve on the image processing executed by the server.

In the embodiment, the cellular phone 1 is used as the terminal. A diversity of other devices connectable with the network may be applied for the image output terminal. For example, the liquid crystal display, the general purpose computer, or the printer may be the terminal. The terminal having the image processing function and the function of controlling the details of the image processing in response to the control signal ensures construction of a system similar to the system of the embodiment. The series of image processing to be executed may adequately be selected according to the type of the terminal.

D2. Modification (2)

In the embodiment discussed above, the cellular phone 1 functioning as an image output device downloads image data from the server 100. The technique of the present invention may be applied to a system of uploading images to the server 100. In this application, a scanner or a digital camera connectable with the network takes in an image, carries out a required series of image processing to process the input image, and transmits the processed image to the server. In this application, the scanner or the digital camera corresponds to the image transmitter device, and the server corresponds to the image receiver device.

Figure 11:
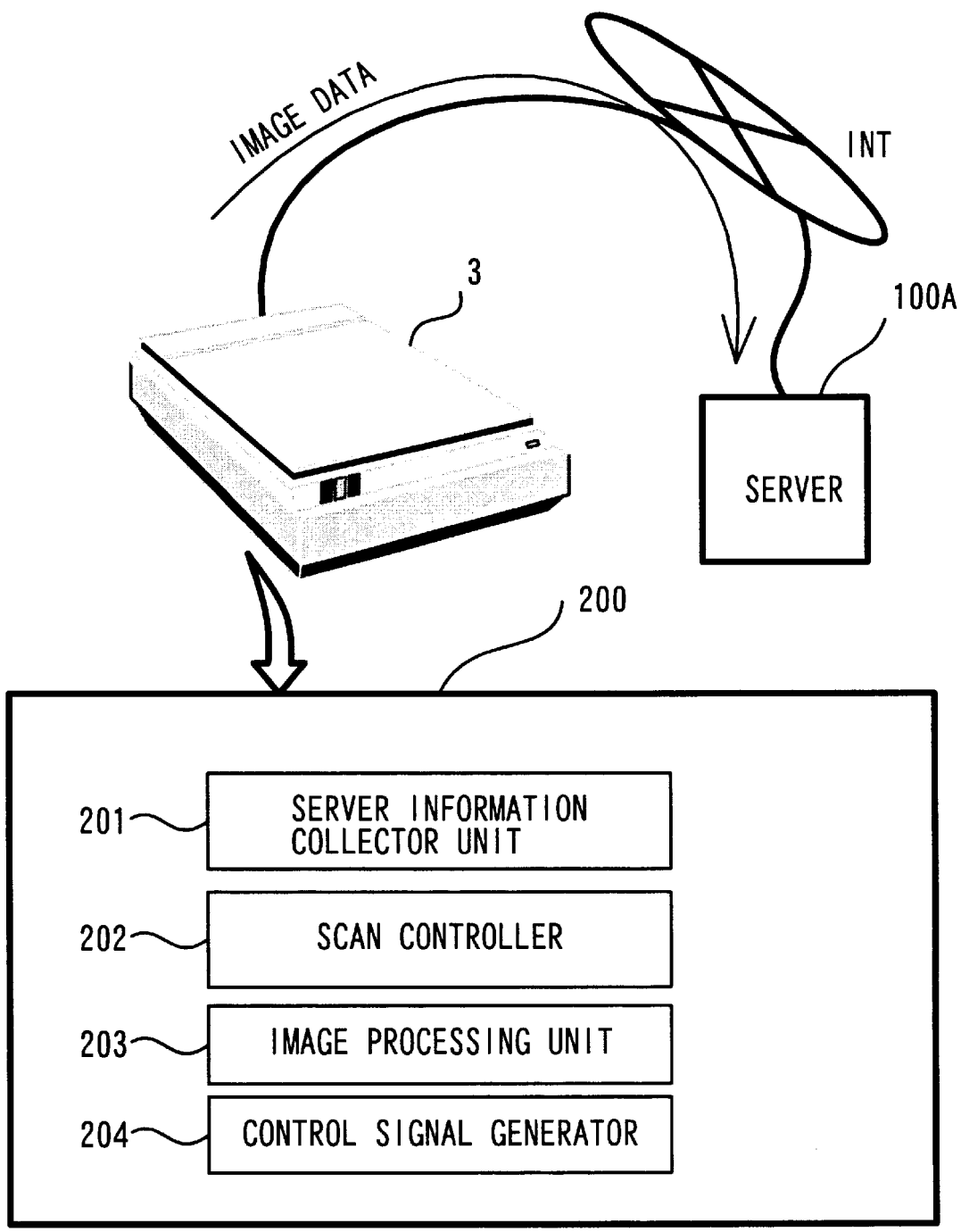
FIG. 11 schematically illustrates a system of uploading images.

FIG. 11 schematically illustrates a system of uploading images. In this example, a scanner 3 is used as an image input device. The scanner 3 has the function of transmitting data via a network and uploads images to a server 100A via the Internet INT.

The server 100A has the same structure as that of the server 100 shown in FIG. 2. The scanner 3 has a scanner processing unit 200 having functional blocks of a server information collector unit 201, a scan controller 202, an image processing unit 203, and a control signal generator 204. The scan controller 202 implements the proper functions of the scanner 3.

The server information controller unit 201 included in the scanner 3 collects device information regarding the server 100A, which functions as the destination of transmitted image data. This corresponds to the function of the server 100 to collect the device information regarding the cellular phone 1 in the above embodiment. The device information includes the image processing capacity of the server 100A.

The image processing unit 203 causes input image data to undergo various series of image processing. The image processing includes color correction of the input image data and adjustment of the contrast. In the same manner as the embodiment, the procedure specifies the series of image processing to be executed by the scanner 3, based on the device information on the server 100A.

The control signal generator 204 generates a control signal, which is used to transmit the result of the image processing executed in the scanner 3 to the server 100A. The image processing unit incorporated in the server 100A identifies the details of the image processing executed by the scanner 3 based on the control signal and carries out a required series of image processing, which has not been executed by the scanner 3. The server 100A changes over the series of image processing based on the device information of the scanner 3 in the same manner as the embodiment. This application also selectively uses the image processing functions of the image input device and the server, thus attaining the effects similar to those of the embodiment.

The above embodiment and its modifications are to be considered in all aspects as illustrative and not restrictive. There may be many modifications, changes, and alterations without departing from the scope or spirit of the main characteristics of the present invention. For example, the diverse control processes discussed above may be attained by the hardware structure, instead of the software configuration.

The scope and spirit of the present invention are indicated by the appended claims, rather than by the foregoing description.

What is claimed is:

1. An image transmitter device that transmits image data via a communication path to an image receiver device connecting with the communication path and having an image processing function, said image transmitter device comprising:

an image processing unit that generates processed data from input master image data by a specified series of image processing;

a control signal generator that generates a control signal for prohibiting a series of image processing to be executed by said image receiver device from including the specified series of image processing carried out by said image processing unit; and a transmitter unit that transmits said processed data and said control signal to said image receiver device, wherein said series of image processing to be executed by said image receiver device may include image processing not carried out by said image processing unit.

2. An image transmitter device in accordance with claim 1, wherein said image receiver device is an image output device for outputting images.

3. An image transmitter device in accordance with claim 2, wherein said image output device is an image display device having a smaller number of expressible tones than a number of tones included in master image data, and the specified series of image processing is a dispersed-type color reduction process.

4. An image transmitter device in accordance with claim 2, wherein said image output device is an image display device having a non-linearity of expressible tones, and said image processing unit carries out a tone correction process to compensate for the non-linearity.

5. An image transmitter device in accordance with claim 2, further comprising:

an output characteristics receiver unit that receives output characteristic information, which specifies image output characteristics of said image output device, from said image output device, wherein said image processing unit specifies the series of image processing to be executed therein according to the output characteristic information and executes the specified series of image processing.

6. An image transmitter device in accordance with claim 5, wherein the output characteristic information includes a parameter used for the specified series of image processing.

7. An image transmitter device in accordance with claim 1, further comprising:

a processing characteristics receiver unit that receives processing characteristic information, which specifies image processing characteristics of said image receiver device, from said image receiver device, wherein said image processing unit specifies the series of image processing to be executed therein according to the processing characteristic information and executes the specified series of image processing.

8. An image receiver device, comprising:

a receiver unit that receives a series of data, including image data, via a communication path;

an image processing unit configured to subject the input image data to a specified series of image processing; and a process controller that identifies details of pre-processing previously executed for the image data, if any, in response to a preset control signal included in the series of received data, and controls the specified series of image processing to be executed by said image processing unit, if any, based on a result of the identification, wherein said process controller prohibits said image processing unit from executing a series of image processing equivalent to the pre-processing.

9. An image receiver device in accordance with claim 8, said image receiver device further comprising:

an image display unit having a smaller number of expressible tones than a number of tones included in master image data; and a driving unit that drives said image display unit, wherein the specified series of image processing is a dispersed-type color reduction process, and said process controller prohibits said image processing unit from executing the color reduction process when the input control signal shows that the image data has already undergone color reduction.

10. An image receiver device in accordance with claim 8, said image receiver device further comprising:

an image display unit having a non-linearity of expressible tones; and a driving unit that drives said image display unit, wherein the specified series of image processing is a tone correction process for compensating the non-linearity, and said process controller prohibits said image processing unit from executing the tone correction process when the input control signal shows that the image data has already undergone an equivalent tone correction.

11. An image transmitter device that transmits image data via a communication path to a plurality of image receiver devices connecting with the communication path, said image transmitter device comprising:
- a specification receiver unit that receives a specification of each image receiver device from each image receiver device of the plurality of image receiver devices;
- an image processing unit that specifies a series of image processing to be executed therein according to the input specification, and generates processed data from input master image data by the specified series of image processing;
- a control signal generator that generates a control signal for prohibiting a series of image processing to be executed by each image receiver device from including the specified series of image processing carried out by said image processing unit; and
- a transmitter unit that transmits said processed data and said control signal to said each image receiver device.

12. A method of transmitting image data via a communication path to an image receiver device connecting with the communication path, said method comprising:
- when master image data has been subjected to a specified series of image processing, transmitting a control signal for prohibiting a series of image processing to be executed by said image receiver device from including the specified series of image processing, in relation with processed data obtained as a result of the image processing.

13. An image processing method in an image receiver device, said image processing method comprising:
- (a) determining requirements of image processing and, when required, specifying a series of image processing to be executed by said image receiver device, in response to a control signal mapped to image data received via a communication path; and
- (b) making the input image data subjected to the specified series of image processing based on a result of the determination in said step (a), and outputting a resulting image,
- wherein said control signal prohibits said image receiver device from executing image processing equivalent to image processing previously applied to said image data.

14. A recording medium in which a program is recorded in a computer readable manner, said program making image data, which is transmitted to an image receiver device connecting with a communication path, subjected to pre-processing, said program causing a computer to perform the functions of:
- making master image data subjected to a specified series of image processing; and
- generating a control signal for prohibiting a series of image processing to be executed by said image receiver device from including the specified series of image processing.

15. A recording medium in which a program is recorded in a computer readable manner, said program controlling operations of an image receiver device, said program causing a computer to perform the functions of:
- determining requirements of image processing and, when required, specifying a series of image processing to be executed by said image receiver device, in response to a control signal mapped to image data received via a communication path; and
- making the input image data subjected to the specified series of image processing based on the determination,
- wherein said control signal prohibits said image receiver device from executing image processing equivalent to image processing previously applied to said image data.

16. An image transmitter device that transmits image data via a communication path to an image receiver device connected to the communication path and having an image processing function, said image transmitter device comprising:
- an image processing unit configured to generate processed data from input master image data by a specified series of image processing;
- a control signal generator configured to generate a control signal for prohibiting an image processing to be executed by said image receiver device from including the specified series of image processing carried out by said image processing unit; and
- a transmitter unit that transmits said processed data and said control signal to said image receiver device,
- wherein the specified series of image processing excludes compression.

* * * * *